United States Patent [19]

Doing et al.

[11] Patent Number: 5,155,346

[45] Date of Patent: Oct. 13, 1992

[54] DEVICE FOR CONVERTING HAND-HELD SCANNER TO HANDS-FREE SCANNER

[75] Inventors: Park Doing, Ithaca, N.Y.; Donald W. Carr, Bloomfield Hills, Mich.; Charles K. Wike, Jr., Ithaca, N.Y.

[73] Assignee: NCR Corporation, Dayton, Ohio

[21] Appl. No.: 625,331

[22] Filed: Dec. 10, 1990

[51] Int. Cl.$^5$ ............................................. G06K 7/10
[52] U.S. Cl. ...................................... 235/472; 235/462
[58] Field of Search ............... 235/462, 472, 454, 455, 235/383, 470; 902/22; 250/239

[56] References Cited

U.S. PATENT DOCUMENTS

| | | | |
|---|---|---|---|
| 4,369,361 | 1/1983 | Swartz et al. | 235/470 |
| 4,521,678 | 6/1985 | Winter | 235/472 |
| 4,652,732 | 3/1987 | Nickl | 235/462 |
| 4,758,732 | 7/1988 | Kyriakides | 250/566 |
| 4,762,984 | 8/1988 | Knowles et al. | 235/383 |
| 4,956,783 | 9/1990 | Teranishi et al. | 235/472 |
| 4,963,721 | 10/1990 | Kohno et al. | 235/462 |
| 4,968,883 | 11/1990 | Leyshon et al. | 250/239 |
| 5,026,975 | 6/1991 | Guber et al. | 235/462 |

FOREIGN PATENT DOCUMENTS

| | | | |
|---|---|---|---|
| 0338543 | 10/1989 | European Pat. Off. | 235/462 |
| 60-168282 | 8/1985 | Japan | 235/462 |

*Primary Examiner*—Robert Weinhardt
*Attorney, Agent, or Firm*—Richard W. Lavin

[57] ABSTRACT

A portable bar code scanner includes a housing member having a pair of sloping supporting surfaces oriented at an angle to each other and a floor portion on which is mounted a reflecting mirror. One of the sloping supporting surfaces includes a transparent substrate. A source of scanning light beams such as a hand-held scanner is mounted adjacent the other sloping supporting surface for projecting a plurality of scanning light beams in the form of a scanning pattern at the reflecting mirror which reflects the scan pattern onto the transparent substrate over which a bar code label is passed enabling the scanning light beams to scan the bar code label. A number of embodiments are disclosed for mounting the hand-held scanner adjacent the other sloping supporting surfaces and include an embodiment of the housing member rotatably mounted for movement to a number of rotated positions.

15 Claims, 7 Drawing Sheets

DEVICE FOR CONVERTING HAND-HELD SCANNER TO HANDS-FREE SCANNER

BACKGROUND OF THE INVENTION

The present invention relates to optical bar code scanning systems and more particularly to a portable bar code scanning device in which a bar code label is moved across a transparent surface on which is projected a scanning pattern for scanning the bar code label during a merchandise checkout operation.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales checkout systems, the grocery industry has adopted a uniform product code (UPC) which is in the form of a bar code. Reading systems which have been constructed to read this type of bar code include hand-held wands which are moved across the bar code and stationary optical scanning systems normally located within the cabinet structure of a checkout counter in which the bar code is read when a purchase merchandise item is moved across a window constituting the scanning area of the counter, which movement is part of the process of loading the item in a baggage cart. Hand-held wands or scanners emit a single scan line which is directed over the bar code by the operator while the stationary optical reader systems emit a multiline scan pattern through which the bar code label is moved, enabling a higher throughput of scanning bar code labels to occur over that of the hand-held scanner. Where the merchandise consist of soft materials such as clothing or other type of wearing apparel, hand-held scanners have been employed to read the bar code labels attached to the material in which the bar code label is manually positioned adjacent the hand-held scanner. It has been found that this type of scanning operation has been ineffective because the bar code label is not positioned within the depth of field of the scanner or that the projected scanning pattern is not located adjacent the bar code label. Because of this, there has arisen a need for a portable scanning device which requires a hands free operation and which increases the number of valid read operations by the scanning device.

The background art known to the applicants at the time of the filing of this application includes U.S. Pat. No. 4,369,361 which discloses a portable stand-alone desk-top laser scanning workstation including a laser scanning head mounted above a support base facing the operator in which objects bearing bar code symbols to be scanned are passed under the head and U.S. Pat. No. 4,766,297 which discloses a support member for supporting a portable hand-held scanning device in which the support member includes structure for sensing the presence of an object between the head portion and the base portion of the support member and for automatically initiating a reading of a bar code symbol by the portable hand-held scanning device each time the sensing structure senses the presence of an object.

SUMMARY OF THE INVENTION

A portable bar code scanning system is provided which comprises a housing member including first and second opposed exterior sloping surfaces in which are mounted transparent substrates and which further includes a mirror member mounted on the floor of the housing member between the sloping surfaces. The housing member further includes an extension portion on which is mounted a support member for supporting one end of a hand-held bar code scanning device. The other end of the scanning device is positioned adjacent the first sloping surface. Upon operation of the bar code scanner when mounted on the housing member, light beams forming an optical scanning pattern are projected from the bar code scanner through the transparent substrate in the first sloping surface towards the mirror member which reflects the scanning pattern onto the transparent substrate mounted in the second sloping surface. The operator will move the bar code label across the substrate member in the second sloping surface adjacent the scanning pattern projected thereon to complete a scanning operation of the bar code label. In a second embodiment, the housing member includes a holder for positioning the head of the bar code scanner within the housing member allowing the bar code scanner to project the scanning light beams onto the mirror member. In a third embodiment, the handle of the bar code scanner is mounted within a recess portion in the extension portion of the housing member. In a fourth embodiment, the housing member is rotatably mounted to a support member for rotational movement to position the second substrate in a plurality of scanning positions in which the bar code scanner is mounted to a support member secured to the housing member. In a fifth embodiment, the bar code scanner is mounted to a separate support member which can be moved to a position adjacent the housing member.

It is therefore a principal object of this invention to provide a portable optical bar code scanning apparatus having a scanning aperture oriented to allow for hands free scanning of a bar code label to occur.

It is another object of this invention to provide a bar code scanner which is light weight and accommodates a hand-held scanner as the source of scanning light beams.

It is another object of this invention to provide a portable bar code scanning device which is simple in construction and therefore low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
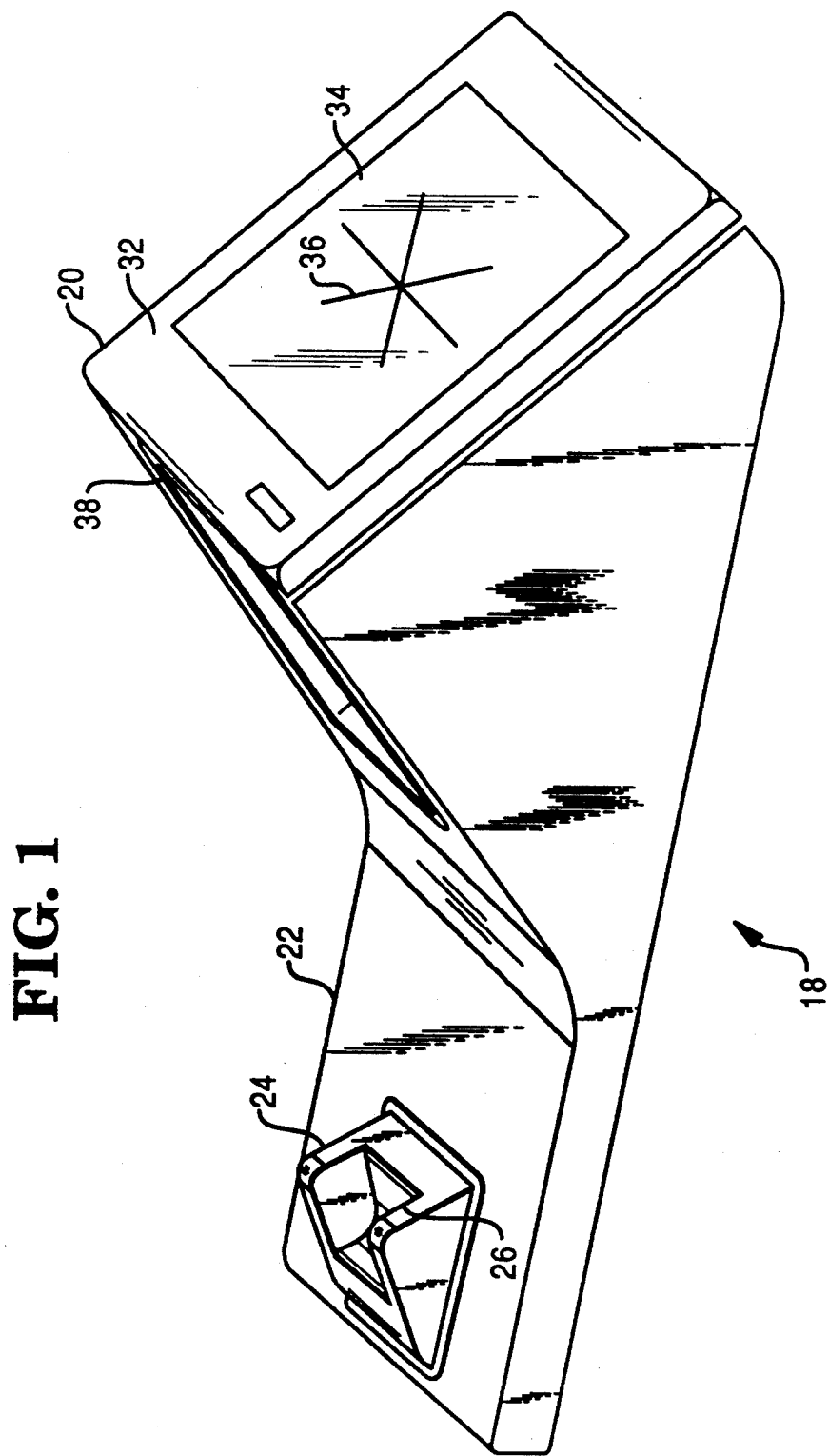
FIG. 1 is a perspective view of one embodiment of the portable optical bar code scanning apparatus of the present invention showing the multi-line scanning pattern generated by the scanning apparatus.
Figure 2:
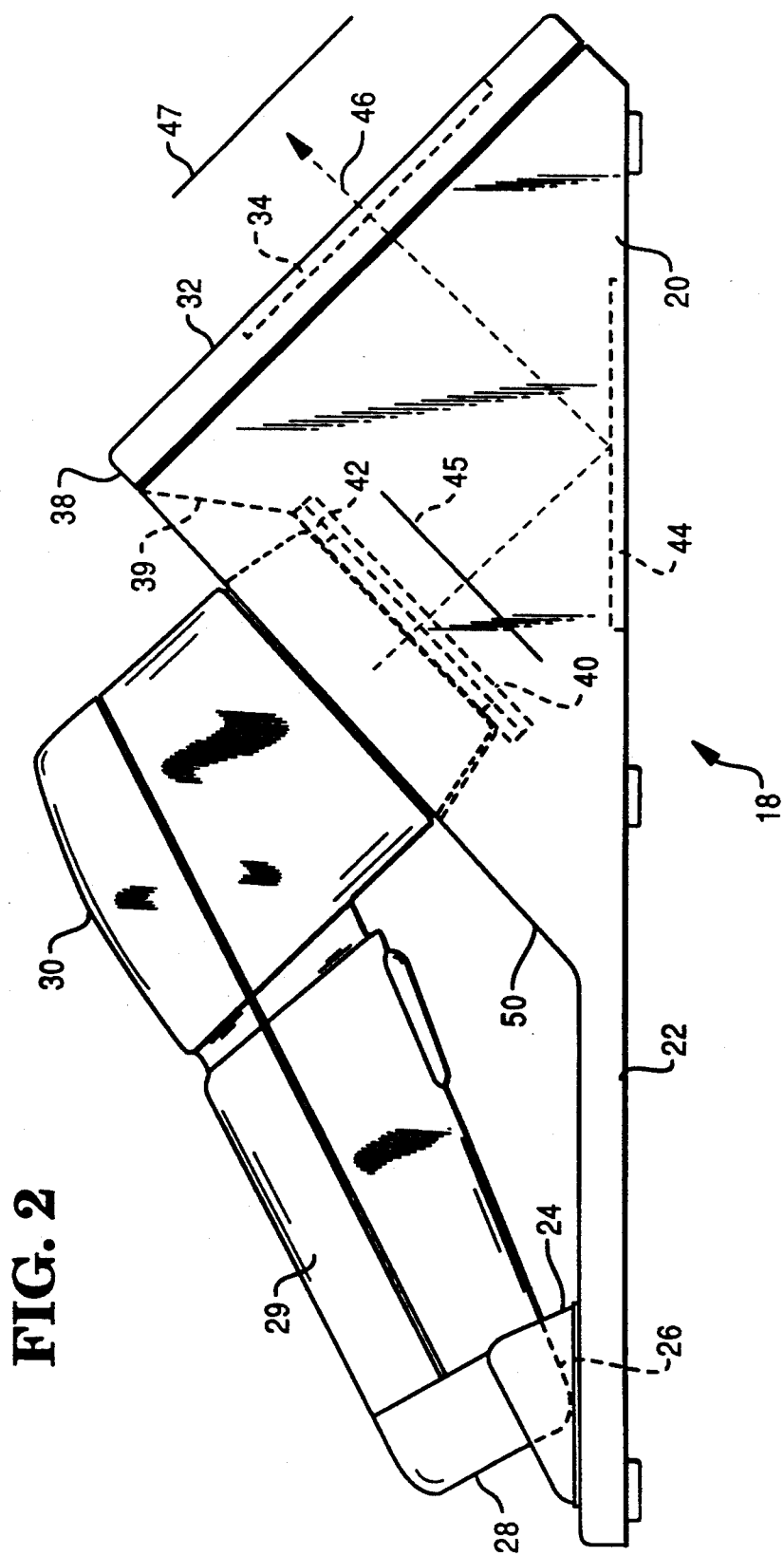
FIG. 2 is a side view of the optical bar code scanning apparatus of the present invention showing the location of the transparent substrates through which the scanning pattern is projected, the mirror for reflecting the scanning light beams and the location of the hand-held scanner when positioned on the bar code scanning apparatus.

Referring now to FIG. 1, there is shown a perspective view of one embodiment of the bar code scanning device generally indicated by the numeral 18 which comprises a front housing portion 20 and a rear housing portion 22 on which is mounted a support member 24 having a cutout portion 26 to accommodate the rear end portion 28 of a hand-held bar code optical scanner 30 (FIG. 2). As best seen from FIG. 2, the front housing portion 20 includes a sloping front surface 32 which includes a transparent substrate 34 mounted therein on which is projected a scanning pattern 36. The front surface 32 is inclined in a upwardly direction.

Figure 3:
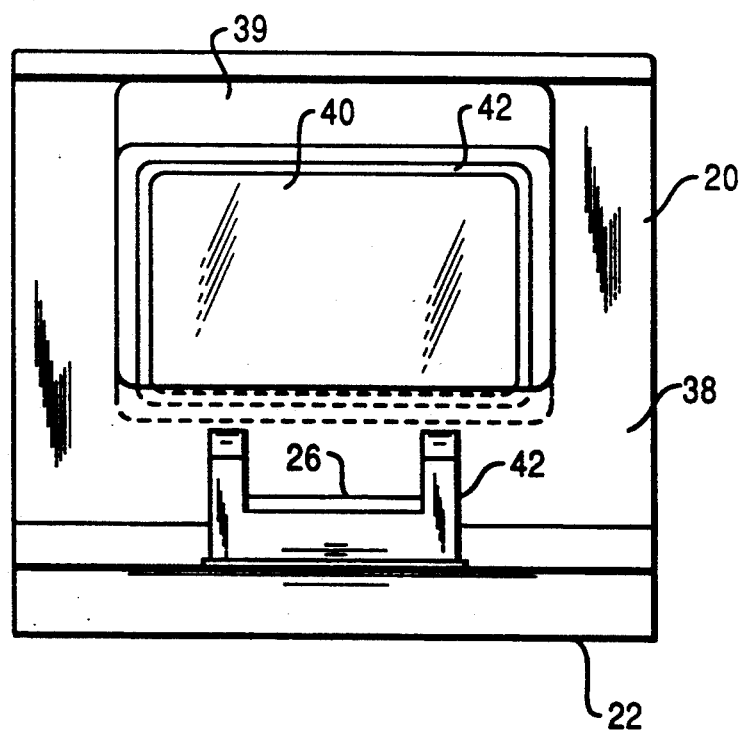
FIG. 3 is a rear elevational view of the portable bar code scanning apparatus showing the location of the entrance transparent substrate and the plastic support member for supporting the head of the scanning apparatus.

The front housing portion 20 further includes a rear sloping surface 38 (FIGS. 1-3 inclusive) in which is mounted an entrance transparent substrate member 40 on which is mounted a plastic guard member 42 which is engaged by the face of the hand-held bar code scanner 30 for supporting the weight of the scanner on the front housing portion 20. Mounted adjacent the floor of the housing portion 20 is a mirror 44 which as shown in FIG. 2 reflects scanning light beams projected along the beam axis 46 by the hand-held scanner 30. The scanning light beams in the form of the scanning pattern 36 (FIG. 1) are reflected from the mirror member 44 to be focused on the surface of the exit transparent substrate 34 enabling the operator to locate the bar code label which is to be scanned adjacent the scanning pattern 36. The substrate 34 may be composed of water white glass while the substrate 40 may comprise a glass window. It is obvious that the substrate 40 may be omitted entirely without effecting the operation of the scanning apparatus.

One of the controlling factors in designing the angle geometry of the substrates 34, 40 and the mirror 44 is the depth of field of the scanning pattern projected by the hand-held scanner 30. It is desirable that the scanning pattern 36 be in focus when projected on the exit transparent substrate 34. In the present embodiment, the depth of field of the projected scanning light beams extends from about an inch in front of the face of the hand-held scanner 30 as indicated by the reference line 45 (FIG. 2) to a point approximately three inches beyond the face of the exit transparent substrate 34 as indicated by the reference line 47 insuring that the bar code label will be scanned when positioned on or adjacent the substrate 34. In another embodiment, the depth of field starts at the location of the substrate 34 which does not restrict the size of the merchandise item which is to be scanned. The angles of the substrates 34 and 40 are approximately 45 degrees to the reflective surface of the mirror 44. It is obvious that the substrates 34 and 40 may be oriented at different angles to accomplish the projection of the scanning pattern on the surface of the substrate 34.

In the operation of the bar code scanning device 18 the operator will cradle the end portion 28 of the handle 29 of the hand-held scanner 30 within the cutoff portion 26 of the support member 24. The operator will then lay the front face portion 50 (FIG. 2) of the scanner 30 onto the plastic insert 42 and turn on the scanner 30 which projects the scanning light beams forming the scan pattern 36 along the beam axis 46 which is reflected from the mirror 44 and is focused on the exit transparent substrate 34. In scanning a bar code label, the label is positioned on the surface of the substrate 34 and moved across the scanning pattern 36 for reading the bar code label in a manner that is well known in the art.

Figure 4:
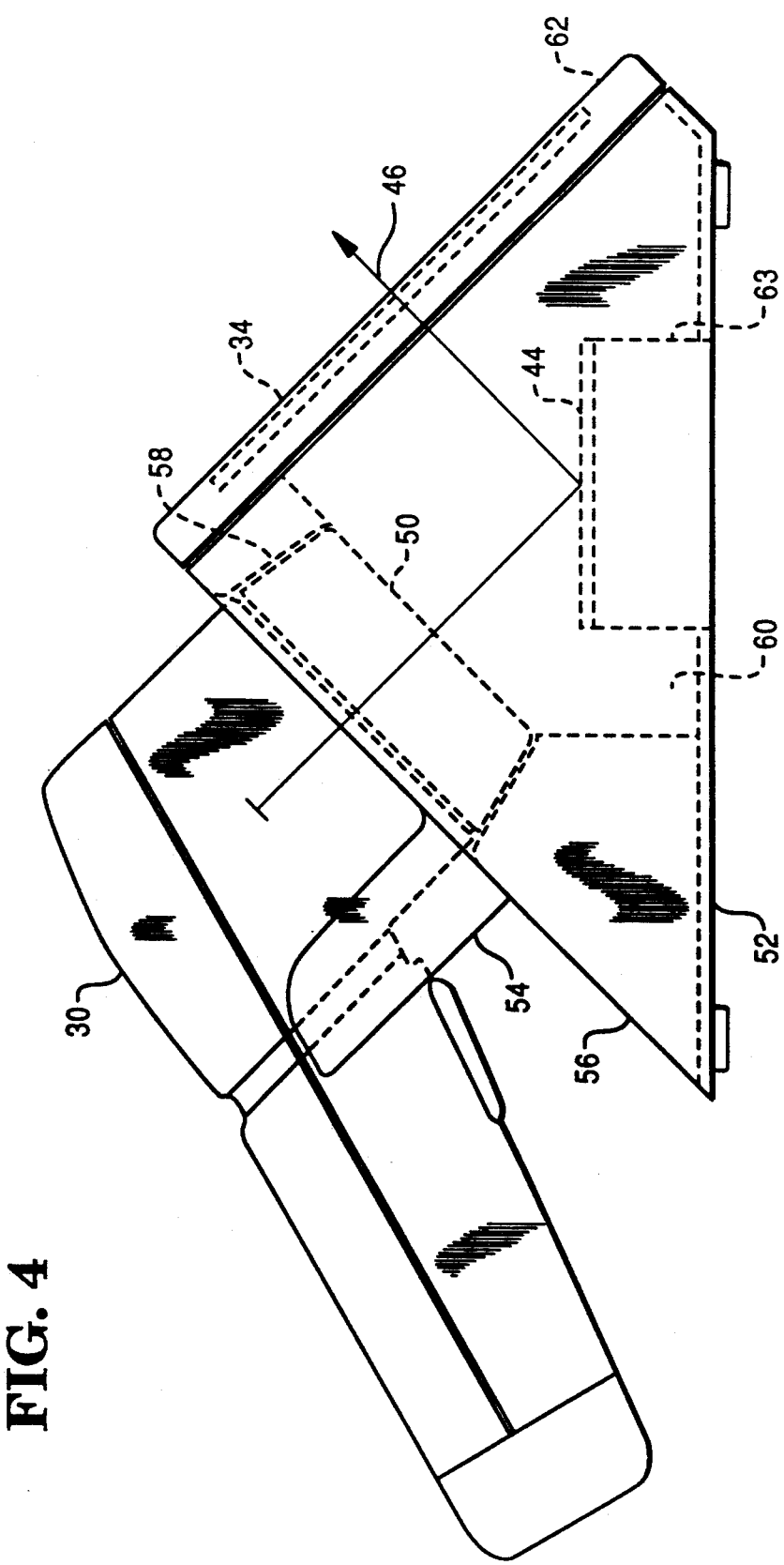
FIG. 4 is a side elevational view of a second embodiment of the optical bar code scanning apparatus which includes a support portion for supporting the hand-held bar code scanning device in contact with the interior of the housing member.

Referring now to FIG. 4, there is shown a second embodiment of the optical bar code scanning device of the present invention which comprises a triangular shaped housing member 52 which includes a saddle type support portion 54 extending from a rear inclined surface 56 of the housing member which also includes a recessed portion 58 opening to the interior 60 of the housing member 52.

Mounted in the front inclined surface 62 of the housing member 52 is the exit transparent substrate 34, while mounted on a support member 63 located within the housing member 52 is the reflecting mirror 44 which reflects the scanning light beams projected from the hand-held scanner 30 along the beam axis 46 for projecting the scanning pattern onto the substrate 34.

Figure 5:
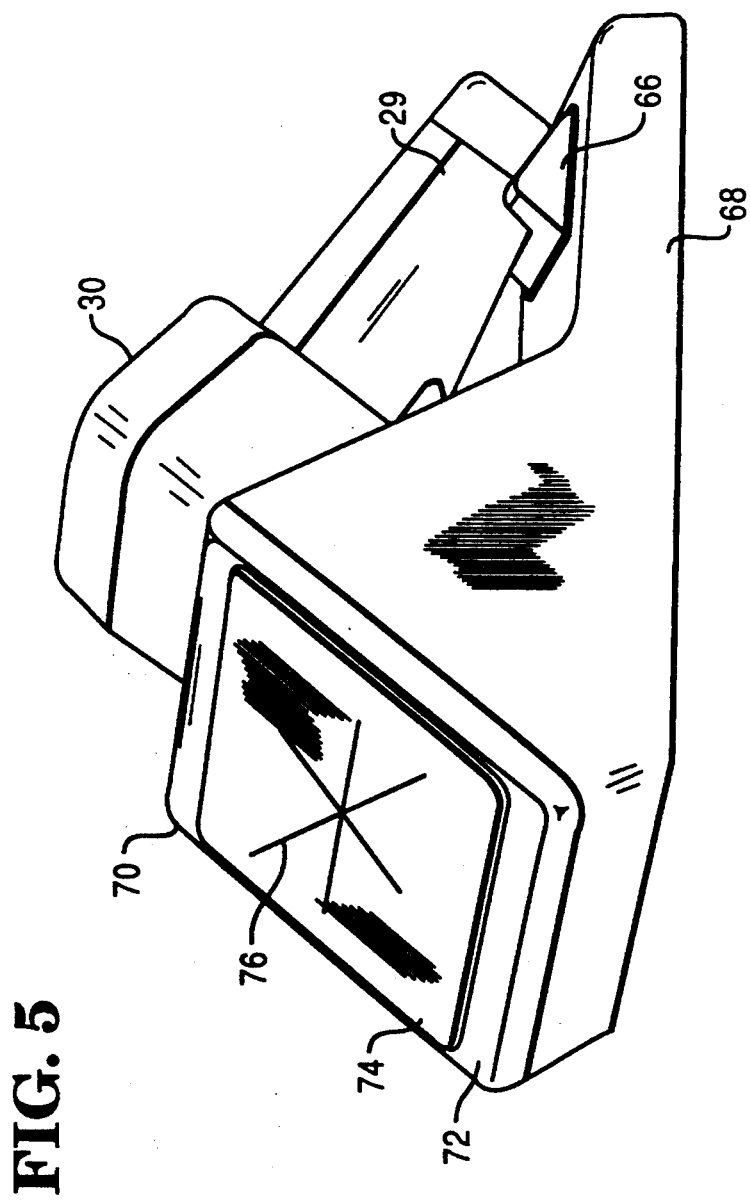
FIG. 5 is a right front perspective view of a third embodiment of the present invention showing the mounting of the hand-held scanner on the optical bar code housing member.

Referring now to FIG. 5, there is shown a front perspective view of a third embodiment of the present invention in which the handle 29 of the hand-held bar code scanner 30 is mounted within a recessed portion 66 located in the rear portion 68 of the housing member 70. Mounted on the front face portion 72 of the housing member 70 is the exit transparent substrate 74 which provides a large scanning area on which the scanning pattern 76 is projected.

Figure 6:
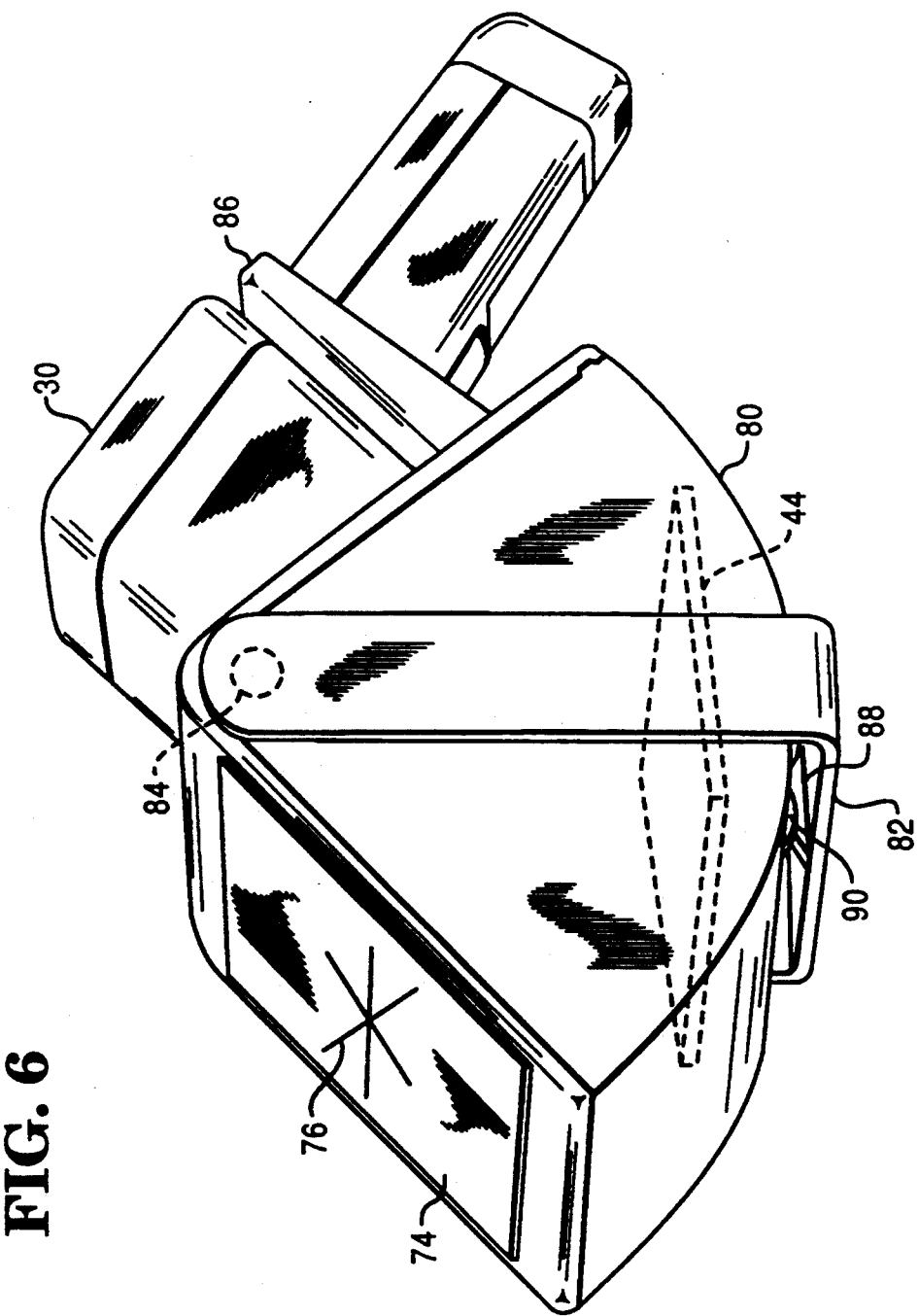
FIG. 6 is a right front elevational view of a fourth embodiment of the present invention in which the optical bar code housing member is mounted on a support member for rotation to a plurality of actuated positions.

Referring now to FIG. 6, there is shown a right front perspective view of a fourth embodiment of the present invention in which the housing member 80 is arcuately shaped and rotatably mounted on a support member 82 by means of studs 84. Mounted within the housing member 80 is the reflecting mirror member 44 which projects the scan light beams through the exit transparent substrate 74 (FIG. 6) on which is projected the scanning pattern 76. Extending from the rear surface portion of the housing member are a pair of support members 86, one of which is shown in FIG. 6, for supporting the hand-held bar code scanner 30 which is positioned within an aperture (not shown) similar to the aperture 58 (FIG. 4) in the housing 80 or the rear surface arrangement shown in FIG. 2, enabling the bar code scanner to project the scanning light beams towards the reflecting mirror 44 in the manner described previously. Mounted on a support member 88 secured to the support member 82 are a pair of roller members 90 frictionally engaging the lower edge of the housing member 80 for holding the housing member in any rotated position allowing the transparent substrate 74 to be moved to a scanning position which is convenient for the operator to scan a bar code label.

Figure 7:
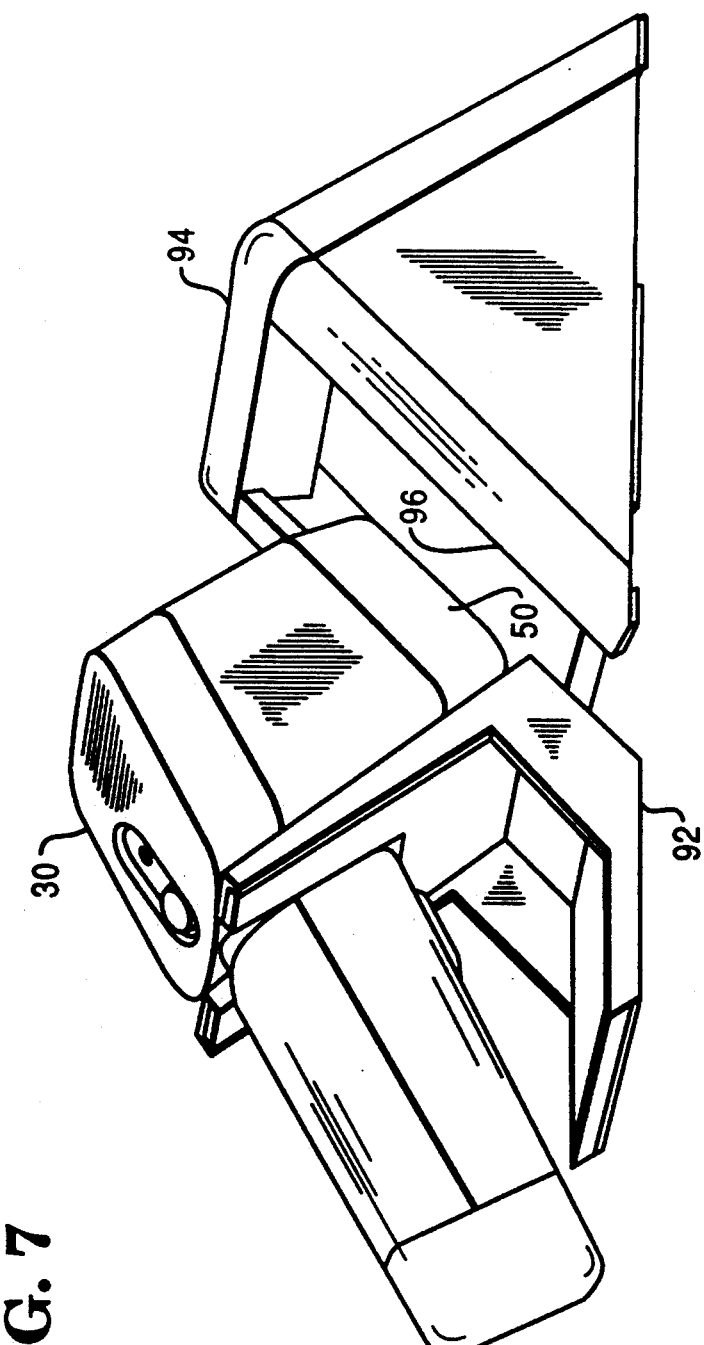
FIG. 7 is a right rear perspective view of a fifth embodiment of the present invention in which the hand-held scanner is mounted on a separate movable support member which is movable to a position locating the hand-held scanner device adjacent the entrance to the interior of the housing member.

Referring to FIG. 7, there is shown a right rear perspective view of a fifth embodiment of the present invention in which the hand-held scanner 30 is mounted on a movable support member 92 which may be positioned adjacent the free standing housing member 94 which includes a recessed portion 96 within which may be positioned the nose portion 50 of the scanner 30 for projecting light beams in the form of the scanning pattern 36 (FIG. 1) at a reflecting mirror (not shown) in the manner previously described. With this arrangement, the bar code scanner 30 can be moved to a position focusing the scan pattern 36 on the exit transparent substrate similar to that of substrate 34 in FIG. 2. It will be seen that the present invention provides a portable bar code scanning device which enables the operator to move a bar code label past the scanner utilizing both hands to grasp the article on which the bar code label is attached.

Although the preferred embodiment of the present invention has been described herein, it is not intended that the invention be restricted thereto, but that it be limited only by the true spirit and scope of the appended claims.

What is claimed is:

1. A scanning system for scanning coded symbols comprising:
   a housing member having an enclosed area including a supporting surface having a first aperture, and a scanning surface oriented at a predetermined angle to said supporting surface having a second aperture;
   a source of scanning light beams removably mounted on top of said first supporting surface and outside said housing member for projecting light beams into the enclosed area of said housing member in a generally downward direction, the source of scanning light beams having a predetermined depth of field starting adjacent the first supporting surface within the enclosure and extending to a point outside the enclosure adjacent the scanning surface; and
   optical means mounted in the enclosed area in said housing member and in registry with said supporting surface and said scanning surface for transmitting and deflecting the scanning light beams in a generally upward direction through the scanning surface for scanning a coded label positioned adjacent the scanning surface and within the depth of field.

2. The system of claim 1 in which said optical means comprises a mirror member mounted at approximately forty-five degrees to the supporting surface and the scanning surface for deflecting the scanning light beams outputted by the source of scanning light beams through the scanning surface.

3. A scanning system for scanning coded symbols comprising:
   a housing member having an enclosed area and including a first supporting surface oriented in a first direction and having an aperture therethrough, a second supporting surface oriented at a first angle to the first supporting surface, a mirror member mounted within the housing member on said second supporting surface, a third supporting surface oriented at a second angle to said first supporting surface and at a third angle to said second supporting surface, and a transparent substrate mounted in said third supporting surface; and
   a source of scanning light beams removably mounted on top of said first supporting surface and outside said housing member, having a predetermined depth of field starting adjacent the first supporting surface within the enclosed area and extending to a point outside the enclosed area adjacent the scanning surface, for projecting light beams into the enclosed area of said housing member in a generally downward direction toward said mirror member which reflected the scanning light beams in a generally upward direction through said transparent substrate for scanning a bar code label positioned adjacent the transparent substrate and within the depth of field.

4. The scanning system of claim 3 which includes a second transparent substrate mounted in said aperture of said first supporting surface for transmitting the scanning light beams projected form the source of scanning light beams into the housing member.

5. The scanning system of claim 3 in which said second angle is approximately 90 degrees.

6. The scanning system of claim 5 in which the first and third angles are approximately 45 degrees.

7. The scanning apparatus of claim 6 in which the source of scanning light beams comprises a hand-held scanning unit having an operating end for emitting the scanning light beams and in which the housing member further includes a rear extension portion, said scanning apparatus further including a supporting member mounted to the rear extension portion for supporting another end of the hand-held scanning unit and positioning the operating end of the hand-held scanner on the first supporting surface.

8. The scanning apparatus of claim 7 which further includes a plastic substrate mounted on said first supporting surface adjacent said second transparent substrate for supporting the operating portion of the hand-held scanning unit adjacent the second transparent substrate.

9. The scanning apparatus of claim 8 in which the first transparent substrate comprises a water white glass window and the second substrate comprises a glass window.

10. The scanning apparatus of claim 3 which further includes a support member secured to the first supporting surface for supporting a source of scanning light beams adjacent the first supporting surface for projecting the light beams at said reflecting mirror.

11. The scanning apparatus of claim 10 in which the first supporting surface includes a recessed portion and said source of scanning light beams comprises a hand held scanner having a nose portion which is positioned within the recessed portion when mounted on the support member.

12. The scanning apparatus of claim 3 in which the housing member has an horizontally extending rear end portion which includes a recessed portion and said source of scanning light beams comprises a hand held scanner having a handle portion which is mounted within said recess portion for supporting said hand held scanner adjacent the first supporting surface.

13. The scanning apparatus of claim 3 which includes a first support member for rotatably supporting said housing member, said scanning apparatus further including a pair of second supporting members secured to the first supporting surface for positioning the source of scanning light beams on the first supporting surface.

14. The scanning apparatus of claim 3 which further includes a movable support member for supporting said source of scanning light beams in a direction perpendicular to the first supporting surface.

15. The scanning apparatus of claim 14 in which said source of scanning light beams comprises a hand held scanner having an operating end for emitting the scanning light beams and said first supporting surface includes a recessed portion in which is positioned the operating end of the hand-held scanner when on said movable support member.

* * * * *

UNITED STATES PATENT AND TRADEMARK OFFICE
CERTIFICATE OF CORRECTION

PATENT NO. : 5,155,346

DATED : October 13, 1992

INVENTOR(S) : Park Doing et al.

It is certified that error appears in the above-identified patent and that said Letters Patent is hereby corrected as shown below:

Column 6, line 13, delete "reflected" and substitute --reflects--.

Column 6, line 21, delete "form" and substitute --from--.

Signed and Sealed this

Thirtieth Day of November, 1993

Attest:

BRUCE LEHMAN

Attesting Officer

Commissioner of Patents and Trademarks